(12) United States Patent
Sugita et al.

(10) Patent No.: US 9,745,482 B2
(45) Date of Patent: Aug. 29, 2017

(54) INKJET RECORDING INK COMPOSITION, INKJET RECORDING METHOD, AND METHOD FOR PRODUCING PRINTED MATERIAL

(71) Applicant: DNP FINE CHEMICALS CO., LTD., Yokohama-shi, Kanagawa (JP)

(72) Inventors: Yukio Sugita, Yokohama (JP); Fumie Yamazaki, Yokohama (JP)

(73) Assignee: DNP FINE CHEMICALS CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/106,027

(22) PCT Filed: Sep. 1, 2014

(86) PCT No.: PCT/JP2014/072950
§ 371 (c)(1),
(2) Date: Jun. 17, 2016

(87) PCT Pub. No.: WO2015/098185
PCT Pub. Date: Jul. 2, 2015

(65) Prior Publication Data
US 2016/0319141 A1    Nov. 3, 2016

(30) Foreign Application Priority Data
Dec. 27, 2013 (JP) .................. 2013-272377

(51) Int. Cl.
C09D 11/12       (2006.01)
C09D 11/023      (2014.01)
B41J 2/01        (2006.01)
C09D 11/322      (2014.01)

(52) U.S. Cl.
CPC ............... C09D 11/12 (2013.01); B41J 2/01 (2013.01); C09D 11/023 (2013.01); C09D 11/322 (2013.01)

(58) Field of Classification Search
CPC ............ C09D 111/12; C09D 111/023; C09D 111/322; C09D 11/12; C09D 11/023; C09D 11/322; B41J 2/01
See application file for complete search history.

(56) References Cited

U.S. PATENT DOCUMENTS

| | | | |
|---|---|---|---|
| 2002/0120040 A1 | 8/2002 | Lin et al. | |
| 2004/0249018 A1 | 12/2004 | Kataoka et al. | |
| 2005/0165159 A1* | 7/2005 | Ogura | C08G 18/6254 524/560 |
| 2005/0287458 A1* | 12/2005 | Veregin | G03G 9/0804 430/108.4 |
| 2010/0010162 A1* | 1/2010 | Itou | C08F 2/54 525/206 |
| 2010/0222498 A1 | 9/2010 | Yatake et al. | |
| 2012/0236070 A1 | 9/2012 | Okuda et al. | |
| 2013/0053485 A1* | 2/2013 | Misawa | C09D 11/324 524/104 |
| 2013/0083117 A1 | 4/2013 | Ohmoto | |
| 2014/0055520 A1 | 2/2014 | Inumaru et al. | |
| 2014/0125743 A1 | 5/2014 | Aruga | |
| 2014/0232782 A1 | 8/2014 | Mukai et al. | |

FOREIGN PATENT DOCUMENTS

| | | |
|---|---|---|
| JP | 2002-258525 A | 9/2002 |
| JP | 2003-261805 A | 9/2003 |
| JP | 2005-048108 A | 2/2005 |
| JP | 2007-161823 A | 6/2007 |
| JP | 2009-221459 A | 10/2009 |
| JP | 2009-291976 A | 12/2009 |
| JP | 2012-051357 A | 3/2012 |
| JP | 2012-193280 A | 10/2012 |
| JP | 2013-082209 A | 5/2013 |
| JP | 2013-177526 A | 9/2013 |
| JP | 2014-091772 A | 5/2014 |
| JP | 2014-162812 A | 9/2014 |

OTHER PUBLICATIONS

International Search Report mailed Oct. 14, 2014; PCT/JP2014/072950.

* cited by examiner

*Primary Examiner* — Huan Tran
*Assistant Examiner* — Alexander D Shenderov
(74) *Attorney, Agent, or Firm* — Ladas & Parry LLP

(57) ABSTRACT

Provided is an inkjet recording ink composition, which has excellent ejection stability and enables the production of a printed material that has excellent water resistance and scratch resistance. Disclosed is an inkjet recording ink composition, which contains a wax emulsion having an average particle diameter of 140 nm or less and containing a polyolefin-based wax with a melting point of 85° C. or more and 120° C. or less, a resin emulsion, a pigment, and an aqueous solvent.

6 Claims, No Drawings

INKJET RECORDING INK COMPOSITION, INKJET RECORDING METHOD, AND METHOD FOR PRODUCING PRINTED MATERIAL

TECHNICAL FIELD

The present invention relates to an inkjet recording ink composition, an inkjet recording method, and a method for producing a printed material.

BACKGROUND ART

Recently, provision of printed materials of various kinds and small lots is under progress, and attention is drawn to, as a substitute for off-set printing of a related art, inkjet printing which is on-demand printing made easy to respond to high speed printing. Furthermore, as compared to conventional off-set printing, the inkjet printing is more convenient and has a merit such as economic value or energy saving.

The inkjet printing is a printing method in which fine ink droplets ejected from a printer head are landed on a recording medium, infiltrated and fixed to form dots, and in accordance with gathering of many of those dots, an image is formed. Accordingly, a printed material is an aggregate of dots that are formed of fine droplets, and thus it is difficult to have an even surface so that poor fixability or scratch resistance may be obtained.

Furthermore, for example, when printing is made on a coated paper having a hydrophobic coating layer formed thereon by using an aqueous ink, it is difficult for the ink to infiltrate into the coated paper. Thus, there is a problem that, as the ink is repelled on a surface of the coated paper and cannot be evenly applied, the printed material tends to have insufficiency in water resistance and solvent resistance.

As a method of fixing an image of a printed material, for example, a method of performing thermocompression bonding by use of a compression bonding roller after an image recording step is known.

Furthermore, in Patent Literature 1, a toner composition for improving light fastness of a printed image and performing water resistant coating by overcoating on an inkjet print is disclosed.

However, those methods cause an increased number of operation processes for inkjet printing, and thus they are unfavorable in terms of having a merit of inkjet printing, such as convenience, economic efficiency, or energy saving.

Meanwhile, a method of adding a wax component, which is conventionally used for a toner, to an inkjet ink is studied (for example, Patent Literatures 2 to 5).

For example, in Patent Literature 2, as a method of improving scratch resistance in the case of recording on a recording medium such as fabrics or resin materials by using an aqueous ink, an inkjet recording method in which ejection is performed while heating an aqueous ink containing a pigment, a fixing resin, and a wax with specific melting point is disclosed.

In Patent Literature 3, an ink composition containing a pigment and a polyolefin wax having a larger particle diameter than dry film thickness, is disclosed as an ink composition with which a recorded image with excellent scratch resistance can be obtained.

In Patent Literature 4, as a scratch resistant inkjet ink composition which hardly causes clogging of an inkjet nozzle, an ink composition containing a pigment, a binder resin, a particulate wax with particle diameter of 0.58 to 3 µm, a moistening agent, and water is disclosed.

Furthermore, in Patent Literature 5, as an image forming method for forming an image with good texture feeling such as touch feeling and excellent scratch resistance, a method of forming an image by applying, based on an inkjet method, an aqueous ink containing polymer particles, a specific amount of wax particles, a colorant, and water on a recording substrate, which is an aggregate of specific fiber materials, is disclosed.

Patent Literature 1: JP 2002-258525 A
Patent Literature 2: JP 2009-291976 A
Patent Literature 3: JP 2005-48108 A
Patent Literature 4: JP 2007-161823 A
Patent Literature 5: JP 2013-82209 A

SUMMARY OF INVENTION

Technical Problem

There is a problem that clogging is easily caused in the inkjet nozzle when an ink containing a wax emulsion with relatively large particle diameter as described in Patent Literatures 3 to 5 is used. In the field of inkjet recording in which additional high resolution is required, it is problematic to have ejection reliability in accordance with high density and high resolution of an inkjet head and high speed printing. Thus, it is necessary to suppress the clogging of an ink in the inkjet nozzle.

The present invention was achieved under the circumstances described above, and an object is to provide an inkjet recording ink composition, which has excellent ejection stability and can produce a printed material that has excellent water resistance and scratch resistance, an inkjet recording method using the inkjet recording ink composition, and a method for producing a printed material.

Solution to Problem

The inkjet recording ink composition according to the present invention contains a wax emulsion having an average particle diameter of 140 nm or less and containing a polyolefin-based wax with a melting point of 85° C. or more and 120° C. or less, a resin emulsion, a pigment, and an aqueous solvent.

According to the inkjet recording ink composition of the present invention, a surfactant in the wax emulsion is preferably 5 parts by mass or less relative to 100 parts by mass of the polyolefin-based wax from the viewpoint of having excellent storage stability of an ink composition and improving the fixability on a recording medium.

According to the inkjet recording ink composition of the present invention, the wax emulsion preferably contains one or more kinds selected from a paraffin wax and a sasol wax from the viewpoint of having excellent glossiness or abrasion resistance of a printed material.

According to the inkjet recording ink composition of the present invention, the resin emulsion preferably contains an acrylic resin having a glass transition temperature of 20° C. or more from the viewpoint of having fixability on a recording medium and water resistance of a printed material.

According to the inkjet recording ink composition of the present invention, the acrylic resin preferably has an acid value of 25 mg KOH/g or less from the viewpoint having excellent storage stability of an ink composition and improving water resistance of a printed material.

The inkjet recording method according to the present invention includes a step of printing by an inkjet method using the above inkjet recording ink composition of the present invention.

Furthermore, the method for producing a printed material of the present invention includes a step of printing by an inkjet method using the above inkjet recording ink composition of the present invention.

Advantageous Effects of Invention

According to the present invention, an inkjet recording ink composition which has excellent ejection stability and can produce a printed material that has excellent water resistance and scratch resistance, an inkjet recording method using the inkjet recording ink composition, and a method for producing a printed material can be provided.

DESCRIPTION OF EMBODIMENTS

Hereinbelow, detailed descriptions are given for an inkjet recording ink composition, a method for producing it, and an inkjet recording method according to the present invention in order.

Incidentally, in the present invention, "(meth)acrylic" means any one of acrylic and methacrylic, and "(meth)acrylate" means any one of acrylate and methacrylate.

[Inkjet Recording Ink Composition]

The inkjet recording ink composition according to the present invention contains a wax emulsion having an average particle diameter of 140 nm or less and containing a polyolefin-based wax with a melting point of 85° C. or more and 120° C. or less, a resin emulsion, a pigment, and an aqueous solvent.

Since the above specific wax emulsion and resin emulsion are used in combination, the inkjet recording ink composition according to the present invention can produce a printed material that has excellent water resistance and scratch resistance, and an inkjet recording ink composition with excellent ejection stability can be obtained. Furthermore, the inkjet recording ink composition according to the present invention has excellent storage stability and can produce a printed material with glossiness.

Although it is not clearly elucidated, the mechanism for exhibiting the aforementioned effects by the above specific combination is presumed to be as follows.

In a related art, an ink composition containing a wax emulsion with relatively large particle diameter is used to improve scratch resistance of a printed material (for example, Patent Literatures 3 and 4). However, there is a problem that clogging in the inkjet nozzle easily occurs when a wax emulsion with large particle diameter is used. There is also a problem that separation or aggregation of the wax emulsion easily occurs in an ink composition containing a wax emulsion with large particle diameter, and thus storage stability of ink decreases. In addition, there is also a problem that a printed material printed by using an ink composition containing a wax emulsion with large particle diameter is easy to have an occurrence of irregularities on a surface, and thus glossiness of the printed material is lost.

As a result of diligent studies, the present inventors have found that, by using a wax emulsion which contains polyolefin-based wax with a melting point of 85° C. or more and 120° C. or less, excellent water resistance or scratch resistance can be obtained even when the average particle diameter thereof is 140 nm or less. In this regard, it is presumed that the wax emulsion contains polyolefin-based wax with a melting point of 85° C. or more and has hardness maintained during heating for printing or drying, and thus excellent scratch resistance is obtained even when the particle diameter is reduced. On the other hand, since the melting point of the polyolefin-based wax is 120° C. or less, use amount of a surfactant can be suppressed and water resistance or solvent resistance of an ink can be improved. Because the ink composition of the present invention contains such a wax emulsion having excellent stability and an average particle diameter of 140 nm or less, the ink can have excellent storage stability. Furthermore, since clogging hardly occurs in the inkjet nozzle, a good ejection property can be obtained. Furthermore, a printed material printed by using such an ink composition hardly has an occurrence of irregularities on a surface, and thus a printed material with glossiness can be provided.

As described above, the inkjet recording ink composition of the present invention can produce a printed material that has excellent water resistance and scratch resistance, and can have excellent ejection stability.

The inkjet recording ink composition of the present invention contains a wax emulsion, a resin emulsion, a pigment, and an aqueous solvent, and within a range in which the effect of the present invention is not impaired, it may contain other components, if necessary. Hereinbelow, each component of the inkjet recording ink composition of the present invention is explained in order.

[Wax Emulsion]

The inkjet recording ink composition according to the present invention uses a wax emulsion having an average particle diameter of 140 nm or less and containing a polyolefin-based wax with a melting point of 85° C. or more and 120° C. or less.

According to the present invention, by containing the above specific wax emulsion, an ink composition having excellent storage stability and ejection stability can be obtained, and an ink composition which can produce a printed material with glossiness and excellent scratch resistance can be provided.

The polyolefin-based wax is a polymer or a copolymer which contains an olefin-based monomer as a main component.

Examples of the olefin-based monomer for constituting the polyolefin-based wax include α-olefin such as propylene, butene, hexene, methylbutene, methylpentene, or methylhexene and cyclic olefin such as norbornene, in addition to ethylene. In the present invention, among them, a wax having acyclic olefin as a main component is preferable, a wax having ethylene or a wax having α-olefin with carbon atom number of 3 or more and 20 or less as a main component is more preferable, and a wax having ethylene, propylene, or butene as a main component is even more preferable.

Incidentally, in the present invention, the main component indicates a component which accounts for 50% by mass or more relative to the whole components.

As a specific example of the polyolefin-based wax containing ethylene, propylene, or butene as a main component preferably include polyethylene, polypropylene, polybutene, an ethylene-propylene copolymer, a propylene-butene copolymer, and an ethylene-propylene-butene copolymer. Examples of the polyethylene include high density polyethylene, medium density polyethylene, and low density polyethylene.

The polyolefin-based wax for constituting a wax emulsion can be used either singly or in combination of two or more kinds.

The content ratio of the polyolefin-based wax is preferably 50 parts by mass or more relative to 100 parts by mass of the total wax amount.

Furthermore, in the present invention, an oxidized polyolefin-based wax obtained by oxidizing a polyolefin-based wax by a known method may be contained as the polyolefin-based wax.

For example, the oxidized polyolefin-based wax may be prepared by introducing an oxygen atom into a molecule while adjusting a polyolefin-based resin with high molecular weight to have a desired molecular weight by thermal decomposition or chemical decomposition. The oxygen atom introduced into the molecule may form a carboxyl group which has a polarity. In the present invention, from the viewpoint of being easily emulsifiable in an aqueous solvent, an oxidized polyolefin-based wax is preferably used.

When the oxidized polyolefin-based wax is used in the present invention, the content ratio is not particularly limited. However, from the viewpoint of the stability of a wax emulsion and scratch resistance of a printed material, the content ratio of the oxidized polyolefin-based wax is preferably 50 parts by mass or less relative to 100 parts by mass of the whole amount of the polyolefin-based wax including the oxidized polyolefin-based wax. It is more preferably 0.1 part by mass or more and 40 parts by mass or less, and even more preferably 1 part by mass or more and 30 parts by mass or less.

Furthermore, within the range in which the effect of the present invention is not impaired, the wax emulsion may further contain a known wax. In the present invention, from the viewpoint of improving the abrasion resistance and having excellent glossiness of a printed material, it preferably contains one or more kinds selected from a paraffin wax and a sasol wax. In the present invention, the paraffin wax indicates a wax including a mixture of chain type saturated hydrocarbons with carbon atom number of 20 or more. Furthermore, in the present invention, the sasol wax (Fischer-Tropsch Wax) indicates a synthetic wax which is produced by a method of synthesizing hydrocarbons with hydrogenation reaction of carbon monoxide using coals as a raw material, and includes saturated hydrocarbons that are linearly linked and has an almost complete linear molecular structure having almost no branch.

In the present invention, when the wax emulsion contains one or more kinds selected from a paraffin wax and a sasol wax, the content ratio is not particularly limited. However, from the viewpoint of improving the glossiness or abrasion resistance of a printed material, the total content ratio of the paraffin wax and sasol wax is preferably 5 parts by mass or more and 30 parts by mass or less relative to 100 parts by mass of the whole amount of the polyolefin-based wax. It is more preferably 10 parts by mass or more and 25 parts by mass or less.

As the polyolefin-based wax of the present invention, the polyolefin-based wax having melting point of 85° C. or more is used from the viewpoint of improving the scratch resistance. In particular, from the viewpoint of further improving the scratch resistance, the polyolefin-based wax preferably has melting point of 90° C. or more, and more preferably 95° C. or more. Meanwhile, in the present invention, the melting point of the polyolefin-based wax is 120° C. or less. When the melting point of the polyolefin-based wax is 120° C. or less, it becomes easier to adjust the average particle diameter of the wax emulsion to 140 nm or less, the use amount of a surfactant for preparing the emulsion can be suppressed, good dispersion stability of the wax emulsion can be obtained, and the water resistance or solvent resistance of the ink composition can be improved.

Incidentally, the melting point of the wax emulsion can be measured by using a device for measuring melting point based on JIS K 0064.

In the present invention, the polyolefin-based wax is in an emulsion state in the ink composition. The method for preparing the polyolefin-based wax as an emulsion is not particularly limited, and it can be suitably selected from known methods of a related art. Examples thereof include a method of mixing the polyolefin-based wax, other wax which is used if necessary, and a known surfactant. As for the surfactant used for an emulsion of the polyolefin-based wax, a surfactant with relatively high lipophilicity is preferable. As specific examples thereof, alkoxylate of long chain alcohol and a salt thereof, polyoxyalkylene alkyl ether and a salt thereof, polyoxyalkylene fatty acid alcohol, glycerin fatty acid ester, and sorbitan fatty acid ester can be preferably mentioned.

In the present invention, from the viewpoint of having excellent dispersion stability of a wax emulsion, the method for producing a wax emulsion is preferably a method in which the polyolefin-based wax, other wax which is used if necessary, and a basic material are admixed with one another and dissolved by heat, and the mixture is admixed with water at high temperature. According to this method, the use amount of a surfactant can be reduced so that the dispersion stability of a wax emulsion is improved.

Examples of the basic material include ammonia, an organic amine, and an alkali metal salt. Among them, the organic amine is preferable and an aminoalcohol is even more preferable.

Furthermore, from the viewpoint of preventing deterioration of the stability of a wax emulsion due to volatilization of aminoalcohol, boiling point of the aminoalcohol is preferably 100° C. or more.

When a surfactant is used for preparing the wax emulsion, the content ratio of the surfactant is not particularly limited. However, from the viewpoint of having excellent storage stability of the ink composition and improving the fixability on a recording medium, it is preferably 5 parts by mass or less relative to 100 parts by mass of the polyolefin-based wax. It is more preferably 3 parts by mass or less, even more preferably 0.01 part by mass or less, and particularly preferably, substantially not contained.

The pH of the wax emulsion is preferably 7 or more and 12 or less and more preferably 7 or more and 10 or less from the viewpoint of improving the storage stability and ejection stability, having compatibility with other components in the ink, and suppressing corrosion of metals in the inkjet nozzle.

Incidentally, the pH of the wax emulsion and resin emulsion which is described below may be measured by a pH meter using a glass electrode based on JIS Z 8802. In the present invention, the pH is measured at 25° C. by using a pH meter HM-30R manufactured by DKK-TOA CORPORATION.

The average particle diameter (average dispersion particle diameter) of the polyolefin-based wax emulsion in the ink is 140 nm or less from the viewpoint of having a dispersion stability of a wax emulsion and excellent ejection property of an ink and excellent glossiness of a printed material according to an inkjet method. In particular, it is preferably 130 nm or less, and even more preferably 120 nm or less. Meanwhile, from the viewpoint of improving the scratch resistance of a printed material, the average particle (average dispersion particle diameter) of a wax emulsion is preferably 30 nm or more.

The average particle diameter (average dispersion particle diameter) of the wax emulsion can be obtained by dynamic light scattering method. The dynamic light scattering method is a method for measuring particle size by utilizing a different light intensity distribution of diffracted and scattered light depending on particle size at the time of exposure of particles to laser beam. For example, the measurement can be performed by using Microtrack grain size distribution analyzer UPA manufactured by NIKKISO CO., LTD. or Concentrated system particle diameter analyzer FPAR-1000 manufactured by Otsuka Electronics Co., Ltd. Furthermore, the measurement is performed in conditions including measurement temperature of 25° C., integration time of 3 minutes, and laser wavelength of 660 nm used for measurement. By analyzing the obtained data by CONTIN method, the scattered light intensity distribution is obtained, and the particle diameter with the highest frequency can be used as the average particle diameter. Incidentally, the average particle diameter described herein indicates a volume average particle diameter. Incidentally, in the present invention, the average particle diameter is measured by using Concentrated system particle diameter analyzer FPAR-1000 manufactured by Otsuka Electronics Co., Ltd.

The content ratio of the wax emulsion in the inkjet recording ink composition of the present invention is not particularly limited. However, from the viewpoint of having stability, water resistance, and solvent resistance of the wax emulsion in an ink, and the fixability or scratch resistance of a printed material, it is preferably 0.05 part by mass or more and 6 parts by mass or less, more preferably 0.1 part by mass or more and 5 parts by mass or less, and even more preferably 0.3 part by mass or more and 4 parts by mass or less relative to 100 parts by mass of whole amount of the ink composition.

[Resin Emulsion]

The resin emulsion of the present invention is not particularly limited and may be suitably selected from known resin emulsions of a related art. Incidentally, in the present invention, the resin emulsion indicates a dispersion in which the continuous phase is an aqueous solvent and the dispersed particles are fine particles of a resin. When a solvent as the continuous phase is reduced by evaporation or permeation, the resin emulsion in an ink has properties of thickening and aggregation with relatively increased concentration.

Thus, the resin emulsion suppresses the permeation of an ink on a recording medium, to promote fixing of a pigment on a recording medium.

Examples of the resin used for the resin emulsion include an acrylic resin, a polystyrene resin, a polyester resin, a vinyl chloride resin, a vinyl acetate resin, a vinyl chloride and vinyl acetate copolymer resin, a urethane resin, a silicone (silicon) resin, an acryl amide resin, an epoxy resin, and copolymer resins thereof. Among them, it is preferable to use the acrylic resin. These resins may be used singly or in combination of two or more kinds.

Incidentally, the acrylic resin in the present invention indicates a resin containing a known (meth)acrylic acid ester monomer at least in part thereof as a constitutional unit, and a styrene-acrylic resin, a polyester-acrylic resin, a urethane-acrylic resin, a vinyl chloride-acrylic resin, a vinyl acetate-acrylic resin, a vinyl chloride and vinyl acetate copolymerized-acrylic resin, a silicone (silicon)-acrylic resin, an acrylamide resin, and an epoxy-acrylic resin are exemplified.

The emulsion of the acrylic resin has excellent dispersion stability, and improves water resistance and solvent resistance of a printed material in which an ink composition containing the acrylic resin emulsion is used. The acrylic resin also has advantages of having a high in that production yield and having excellent safety due to a small amount of residual monomers.

As for the monomer for constituting the acrylic resin, one or two or more kinds of monomer may be suitably selected from known (meth)acrylic acid ester monomers and used. Incidentally, in the present invention, it is preferable to have a (meth)acrylic acid ester monomer having no acidic group as a main component and used in combination with a monomer having an acidic group.

Incidentally, in the present invention, the acidic group means a group which exhibits acidity in water, and examples thereof include a carboxy group, a sulfo group, a phosphate group, an acid anhydride thereof, and acid halide.

As for the monomer having no acidic group, a monomer can be suitably selected from known ones.

As for the monomer having no acidic group, a monofunctional (meth)acrylic acid ester monomer is preferably used as a main component. In particular, a monomer having no acidic group, no amide group, no imide group, and no hydroxyl group is preferably used as a main component. Examples of the monofunctional (meth)acrylic acid ester monomer which is preferably used include (meth)acrylic acid alkyl ester, (meth)acrylic acid aralkyl ester, and (meth)acrylic acid alkoxyalkyl ester. Specific examples include mono(meth)acrylic acid ester such as methyl (meth)acrylic acid, ethyl (meth)acrylic acid, propyl (meth)acrylic acid, butyl (meth)acrylic acid, pentyl (meth)acrylic acid, neopentyl (meth)acrylic acid, hexyl (meth)acrylic acid, 2-ethylhexyl (meth)acrylic acid, octyl (meth)acrylic acid, nonyl (meth)acrylic acid, dodecyl (meth)acrylic acid, tridecyl (meth)acrylic acid, stearyl (meth)acrylic acid, cyclopentyl (meth)acrylic acid, cyclohexyl (meth)acrylic acid, 2-methylcyclohexyl (meth)acrylic acid, dicyclopentanyl (meth)acrylic acid, dicyclopentenyl (meth)acrylic acid, dicyclopentanyloxyethyl (meth)acrylic acid, dicyclopentenyloxyethyl (meth)acrylic acid, dicyclohexyl (meth)acrylic acid, isobornyl (meth)acrylic acid, adamantyl (meth)acrylic acid, allyl (meth)acrylic acid, propargyl (meth)acrylic acid, phenyl (meth)acrylic acid, naphthyl (meth)acrylic acid, anthracenyl (meth)acrylic acid, anthranynonyl (meth)acrylic acid, piperonyl (meth)acrylic acid, furyl (meth)acrylic acid, furfuryl (meth)acrylic acid, tetrahydrofuryl (meth)acrylic acid, tetrahydrofurfuryl (meth)acrylic acid, pyranyl (meth)acrylic acid, benzyl (meth)acrylic acid, phenethyl (meth)acrylic acid, cresyl (meth)acrylic acid, glycidyl (meth)acrylic acid, 3,4-epoxycyclohexylmethyl (meth)acrylic acid, 3,4-epoxycyclohexylethyl (meth)acrylic acid, 1,1,1-trifluoroethyl (meth)acrylic acid, perfluoroethyl (meth)acrylic acid, perfluoropropyl (meth)acrylic acid, heptadecafluorodecyl (meth)acrylic acid, triphenylmethyl (meth)acrylic acid, cumyl (meth)acrylic acid, 3-(N,N-dimethylamino)propyl (meth)acrylic acid, methoxyethyl (meth)acrylic acid, ethoxyethyl (meth)acrylic acid, butoxyethyl (meth)acrylic acid, 2-cyanoethyl (meth)acrylic acid, trimethoxysilylpropyl (meth)acrylic acid, triethoxysilylpropyl (meth)acrylic acid, 3-methacryloxypropylmethyldiethoxysilane, and 3-methacryloxypropylmethyldimethoxysilane. Those monomers can be obtained from MITSUBISHI RAYON CO., LTD., NOF CORPORATION, Mitsubishi Chemical Corporation, and Hitachi Chemical Company, Ltd., for example.

Since the aforementioned monomers are suitable for synthesis of a resin emulsion having a low acid value which shows good reactivity and good dispersion stability during the synthesis, and thus preferable.

The monomers having no acidic group for forming an acrylic resin may have, other than the aforementioned monofunctional (meth)acrylic acid ester monomer, other monomers, if necessary.

Other monomers are not particularly limited as long as it can provide desired water resistance and solvent resistance and may be a monofunctional monomer having one ethylenically unsaturated double bond, or a polyfunctional monomer having two or more ethylenically unsaturated double bonds.

For example, a vinyl monomer such as vinyl acetate, vinyl chloride, vinylidene chloride, vinyl fluoride, vinylidene fluoride, N-vinyl pyrrolidone, vinyl pyridine, N-vinyl carbazole, vinyl imidazole, vinyl ether, vinyl ketone, or vinyl pyrrolidone; an aromatic vinyl monomer such as styrene, α-, o-, m-, p-alkyl, nitro, cyano, amide, ester derivatives of styrene, vinyl toluene, or chlorostyrene; an olefin monomer such as ethylene, propylene, or isopropylene; a diene monomer such as butadiene or chloroprene; and a vinylcyanide compound monomer such as acrylonitrile or methacrylonitrile can be used.

Furthermore, a diacrylate compound such as polyethylene glycol diacrylate, triethylene glycol diacrylate, or 1,3-butylene glycol diacrylate; a triacrylate compound such as trimethylolpropanetriacrylate, trimethylolethane triacrylate, or tetramethylolmethane triacrylate; a dimethacrylate compound such as ethylene glycol dimethacrylate, diethylene glycol dimethacrylate, or triethylene glycol dimethacrylate; a trimethacrylate compound such as trimethylolpropane trimethacrylate, or trimethylolethane trimethacrylate; and divinybenzene can be used, for example. Those monomers can be used either singly or in combination of two or more kinds.

Since performance can be given to an acrylic resin or reactivity during the synthesis can be controlled by the monomer, it is preferable.

Furthermore, as a monomer having no acidic group, a monomer having an amide group or an imide group or a monomer having a hydroxyl group may be used.

Examples of the monomer having an amide group or an imide group include an acrylamide monomer such as acrylamide or N,N-dimethylacrylamide, (meth)acrylic acid anilide, monomaleimide such as N-benzylmaleimide, N-phenylmaleimide, N-cyclohexylmaleimide, N-laurinmaleimide, or N-(4-hydroxyphenyl)maleimide, and phthalimide such as N-(meth)acryloyl phthalimide.

Furthermore, examples of the monomer having a hydroxyl group include 2-hydroxyethyl (meth)acrylate, 2-hydroxypropyl (meth)acrylate and methyl α-(hydroxymethyl) (meth)acrylate, ethyl α-(hydroxymethyl) (meth)acrylate, n-butyl α-(hydroxymethyl) (meth)acrylate, 1,4-cyclohexanedimethanolmono (meth)acrylate, and 4-hydroxybutyl (meth)acrylate.

Examples of the monomer having an acidic group, include a monomer containing a carboxy group, a sulfo group, a phosphate group, and an acid anhydride or acid halide thereof. Among them, preferred examples include a monomer containing a carboxy group which has a carboxy group and an ethylenically unsaturated double bond such as acrylic acid, methacrylic acid, crotonic acid, itaconic acid, maleic acid, and fumaric acid. In particular, acrylic acid and methacrylic acid are more preferable. The monomer having an acidic group may be used either singly or in combination of two or more kinds.

The content ratio of the monomer having an acidic group in the acrylic resin is, relative to 100 parts by mass of the total amount of monomers in the acrylic resin, preferably 4 parts by mass or less, more preferably 3 parts by mass or less, and even more preferably 2 parts by mass or less. Meanwhile, the monomer having an acidic group is, relative to 100 parts by mass of the total amount of monomers in the acrylic resin, preferably 0.005 part by mass or more, more preferably 0.01 part by mass or more, and even more preferably 0.02 part by mass or more. When the content ratio of the monomer having an acidic group is equal to or more than the above lower limit value, excellent dispersion stability can be obtained. Furthermore, when the content ratio of the monomer having an acidic group is equal to or less than the above upper limit value, excellent water resistance or solvent resistance can be obtained.

The content ratio of the monomer awing no acidic group is, relative to 100 parts by mass of the total amount of monomers in the acrylic resin, preferably 96 parts by mass or more, more preferably 97 parts by mass or more, and even more preferably 98 parts by mass or more. Meanwhile, the monomer having no acidic group is, relative to 100 parts by mass of the total amount of monomers in the acrylic resin, preferably 99.995 parts by mass or less, more preferably 99.99 parts by mass or less, and even more preferably 99.98 parts by mass or less. In particular, the content ratio of the monomer having no acidic group, no amide group, no imide group, and no hydroxyl group is, relative to 100 parts by mass of the total amount of monomers in the acrylic resin, preferably 96 parts by mass or more, more preferably 97 parts by mass or more, and even more preferably 98 parts by mass or more. In particular, the content ratio of the monomer having no acidic group, no amide group, no imide group, and no hydroxyl group is, relative to 100 parts by mass of the total amount of monomers in the acrylic resin, preferably 99.995 parts by mass or less, more preferably 99.99 parts by mass or less, and even more preferably 99.98 parts by mass or less. When the content ratio of the monomer not having any one of an acidic group, an amide group, an imide group, and a hydroxyl group is within the aforementioned range, not only excellent dispersion stability but also excellent water resistance and solvent resistance can be obtained.

When a monomer having an amide group or an imide group is used, the content ratio is, relative to 100 parts by mass of the total amount of monomers in the acrylic resin, preferably 1 part by mass or less, and more preferably 0.5 part by mass or less from the viewpoint of ensuring water resistance, solvent resistance, and storage stability and suppressing resin yellowing.

Furthermore, the content ratio of a monomer having a hydroxyl group is, relative to 100 parts by mass of the total amount of monomers in the acrylic resin, preferably 3 parts by mass or less, more preferably 1 part by mass or less, and even more preferably 0.5 part by mass or less from the viewpoint of ensuring water resistance and solvent resistance.

In the present invention, the acrylic resin can be obtained by copolymerization of those monomers according to a known method. Examples thereof include an emulsion polymerization method, a suspension polymerization method, and a solution polymerization method. Furthermore, a production method in which water, monomers, an emulsifying agent, and a polymerization initiator are mixed and subjected to emulsion polymerization followed by neutralization can be used. The neutralizing agent used for the neutralization may be suitably selected from known neutralizing agents of a related art. Specific examples of the neutralizing agent include ammonia, aminoalcohol, and an alkali metal salt.

Incidentally, as the emulsifying agent, a surfactant generally used for emulsion polymerization can be used. As the surfactant used for the resin emulsion, a surfactant with relatively high hydrophilicity is preferable. Specifically, polyoxyethylene type nonionic and/or ionic surfactant can be preferably exemplified. Furthermore, those described in, for example, JP 2012-51357 A may be used as an emulsifying agent.

The acrylic resin can be any one of a block copolymer, a random copolymer, and a graft copolymer.

In the present invention, the acid value of the resin is not particularly limited. In particular, from the viewpoint having excellent resistance such as water resistance, solvent resistance, and oil resistance of a printed material, the acid value of the resin is preferably 25 mg KOH/g or less, more preferably 20 mg KOH/g or less, and even more preferably 15 mg KOH/g or less. Furthermore, by using a resin having an acid value of 25 mg KOH/g or less, an interaction with a dispersing agent or a pigment can be reduced and a change in properties like surface tension or viscosity is suppressed, and thus the storage stability of an ink can be enhanced. Furthermore, from the viewpoint of suppressing aggregation between resin emulsions, the acid value of the resin is preferably 0.01 mg KOH/g or more.

Incidentally, the acid value in the present invention indicates mass (mg) of potassium hydroxide which is required for neutralizing an acidic component contained in 1 g of a sample (solid component in the resin), and it is a value measured in conformity with the method described in JIS K 0070.

In the present invention, the amine value of the resin is, although not particularly limited, preferably 10 mg KOH/g or less from the viewpoint of having excellent water resistance and solvent resistance and also excellent storage stability and yellowing resistance. It is more preferably 5 mg KOH/g or less, and even more preferably 2 mg KOH/g or less.

Incidentally, the amine value in the present invention indicates mass (mg) of potassium hydroxide that is an equivalent amount of hydrochloric acid amount required for neutralizing a solid component contained in 1 g of the resin, and it is a value measured in conformity with the method described in JIS K 7237.

Furthermore, in the present invention, the hydroxyl group value of the resin is not particularly limited, but from the viewpoint of having excellent water resistance and solvent resistance and also excellent storage stability, it is preferably 10 mg KOH/g or less, more preferably 5 mg KOH/g or less, and even more preferably 2 mg KOH/g or less.

Incidentally, in the present invention, the hydroxyl group value indicates mg of potassium hydroxide that is required for aceylating OH group contained a solid component contained in 1 g of the resin, and it is measured in conformity with the method described in JIS K 0070, that is, OH group in a sample is aceytylated by using acetic anhydride and unused acetic acid is titrated with an aqueous solution of potassium hydroxide.

Incidentally, the acid value, amine value, and hydroxyl group value can be suitably adjusted based on the type or content ratio of the monomer for forming the resin.

The pH of the resin emulsion is preferably 7 or more and 12 or less and more preferably 7 or more and 10 or less from the viewpoint of enhancing storage stability or ejection stability and suppressing metal corrosion of an inkjet nozzle.

Although the molecular weight of the resin used in the present invention can be suitably selected and it is not particularly limited, from the viewpoint of dispersion stability of a resin emulsion and water resistance and solvent resistance of a printed material, the weight average molecular weight is preferably 10,000 or more, and more preferably in the range of 10,000 or more and 1,000,000 or less, and even more preferably 10,000 or more and 500,000 or less.

Incidentally, the weight average molecular weight Mw is a value measured by GPC (gel permeation chromatography) (HLC-8120GPC manufactured by TOSOH CORPORATION), and it is measured as follows: N-methylpyrrolidone added with 0.01 mol/liter lithium bromide is used as a solvent for elution, Mw 377400, 210500, 96000, 50400, 20650, 10850, 5460, 2930, 1300, 580 (Easi PS-2 series, all manufactured by Polymer Laboratories) and Mw 1,090,000 (manufactured by TOSOH CORPORATION) are used as a polystyrene standard for calibration curve and TSK-GEL ALPHA-M×2 columns (manufactured by TOSOH CORPORATION) are used.

In the present invention, it is more preferable to use a resin emulsion which contains an acrylic resin with glass transition temperature (Tg) of 20° C. or more. By using a resin emulsion which contains an acrylic resin with glass transition temperature of 20° C. or more, stickiness after drying of a printed surface is reduced so that excellent resistance of a printed material can be obtained. With reduced stickiness, an occurrence of blocking, which is a problem of having adhesion of a printed surface of a printed material onto other member when overlaying printed materials, can be suppressed. Furthermore, by using a resin emulsion which contains an acrylic resin with glass transition temperature of 20° C. or more, the water resistance and solvent resistance of a printed material can be improved, and even when a coated paper is used, a printed material that has excellent water resistance and solvent resistance can be provided.

In particular, the acrylic resin of the present invention preferably has glass transition temperature (Tg) which is in the range of from 20° C. or more and 90° C. or less. It is more preferably in the range of from 30° C. or more and 80° C. or less, and even more preferably from 40° C. or more and 70° C. or less. As the Tg is equal to or higher than the above lower limit value, stickiness after drying of a printed surface is reduced so that excellent resistance of a printed matter can be obtained. Furthermore, as the Tg is equal to or lower than the above upper limit value, application of a high temperature for drying a printed material can be avoided so that the energy cost can be reduced or damages of a printing substrate caused by heat can be avoided.

Incidentally, the Tg can be adjusted based on the type or content of monomer for forming the resin.

In the present invention, the glass transition temperature (Tg) can be measured by differential scanning calorimeter (DSC) based on JIS K 6900. Incidentally, the glass transition temperature (Tg) of the present invention is measured by a differential scanning calorimeter "DSC-50" which is manufactured by SHIMADZU CORPORATION.

In the inkjet recording ink composition of the present invention, the content ratio of the resin emulsion is, although not particularly limited, preferably 0.05 part by mass or more and 20 parts by mass or less, more preferably 0.1 part by mass or more and 15 parts by mass or less, and even more preferably 1 part by mass or more and 10 parts by mass or less relative to 100 parts by mass of the whole amount of the ink composition, from the viewpoint of the stability of a resin emulsion in the ink, water resistance, and solvent resistance.

In the inkjet recording ink composition of the present invention, the average particle diameter (average dispersion particle diameter) of the resin emulsion in ink is, although not particularly limited, preferably 500 nm or less, more preferably 200 nm or less, and even more preferably 150 nm or less from the viewpoint of having dispersion stability of a resin emulsion and having excellent ejection property of an ink in inkjet method and excellent glossiness of a printed material. Incidentally, it is preferable that the lower limit of the average particle diameter is as low as possible, and thus it is not particularly limited. However, it is generally 30 nm or more.

[Pigment]

The pigment of the present invention can be suitably selected from known pigments that are used for an aqueous ink, and it can be either an organic pigment or an inorganic pigment.

Examples of the organic pigment include an insoluble azo pigment, a soluble azo pigment, a dye derivatives, phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, an organic solid solution pigment like a quinacridone-based solid solution pigments and perylene-based solid solution pigment, and other pigments such as carbon black.

When the organic pigment is exemplified with Color Index (C.I.) number, examples thereof include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, 214; C.I. Pigment Red 5, 7, 9, 12, 48, 49, 52, 53, 57, 97, 112, 122, 123, 147, 149, 168, 177, 180, 184, 192, 202, 206, 209, 215, 216, 217, 220, 223, 224, 226, 227, 228, 238, 240, 254; C.I. Pigment Orange 16, 36, 43, 51, 55, 59, 61, 64, 71; C.I. Pigment Violet 19, 23, 29, 30, 37, 40, 50; C.I. Pigment Blue 15, 15:1, 15:3, 15:4, 15:6, 16, 22, 60, 64; C.I. Pigment Green 7, 36, 58; and C.I. Pigment Brown 23, 25, 26.

Examples of the inorganic pigment barium sulfate, iron oxide, zinc oxide, barium carbonate, barium sulfate, silica, clay, talc, titanium oxide, calcium carbonate, synthetic mica, alumina, zinc flower, lead sulfate, yellow lead, zinc sulfide, Bengala (red iron oxide (III)), cadmium red, Ultramarine blue, Prussian blue, chrome oxide green, cobalt green, amber, titan black, synthetic iron black and an inorganic solid solution pigment.

The average dispersion particle diameter of the pigment is not particularly limited if it allows obtainment of desired color. It may vary depending on the type of a pigment to be used. However, from the viewpoint of having good pigment dispersion stability and sufficient coloring performance, it is preferably in the range of 5 nm or more and 200 nm or less, and more preferably in the range of 30 nm or more and 150 nm or less. That is because, when the average dispersion particle diameter is lower than the upper limit value described above, it is unlikely to have clogging of a nozzle of an inkjet head and an image with high reproducibility and high evenness can be obtained to provide a printed material with high quality. On the other hand, when it is lower than the lower limit described below, the light resistance may be impaired.

The content of the pigment is not particularly limited if it allows forming of a desired image, and it can be suitably adjusted. Specifically, it is preferably in the range of 0.05 parts by mass or more and 20 parts by mass or less, and more preferably in the range of 0.1 parts by mass or more and 10 parts by mass or less relative to 100 parts by mass of the whole amount of the ink composition, although it may vary depending on the type of a pigment. That is because, as the content is within the above range, the pigment having a good balance between the dispersion stability and coloration performance can be provided.

Furthermore, the pigment of the present invention can be a pigment dispersion in which the above pigment is dispersed in an aqueous solvent with a use of a surfactant or a dispersing agent for pigment dispersion, or it may be included, on a surface of the pigment, as a self-dispersion type pigment dispersion modified with hydrophilic group. In the present invention, a self-dispersion type pigment dispersion is preferably used from the viewpoint of water resistance.

Examples of the self-dispersion type pigment include those modified with a carbonyl group, a carboxyl group, a hydroxyl group, a sulfonic acid group, or a phosphorus-containing group containing at least one P—O or P=O bond which is described in JP 2012-51357 A as a hydrophilic group. Furthermore, examples of a commercially available product include "CAB-O-JET (registered trade mark) 200", "CAB-O-JET (registered trade mark) 250C", "CAB-O-JET (registered trade mark) 260M", "CAB-O-JET (registered trade mark) 270Y", "CAB-O-JET (registered trade mark) 740Y", "CAB-O-JET (registered trade mark) 300", "CAB-O-JET (registered trade mark) 400", "CAB-O-JET (registered trade mark) 450C", "CAB-O-JET (registered trade mark) 465M", "CAB-O-JET (registered trade mark) 470Y", and "CAB-O-JET (registered trade mark) 480V" manufactured by Cabot Specialty Chemicals Corporation; "Microjet black 162, Aqua-Black 001", "BONJET (registered trade mark) BLACK CW-1" "BONJET (registered trade mark) BLACK CW-2" and "BONJET (registered trade mark) BLACK CW-3" manufactured by Orient Chemical Industries Co., Ltd.; and "LIOJET (registered trade mark) WD BLACK 002C" manufactured by Toyo Ink Co., Ltd. Among them, a self-dispersion type pigment which is modified with a phosphorus-containing group containing at least one P—O or P=O bond is preferable in that as it has excellent ink fixability or water resistance. The self-dispersion type pigment can be used either singly or in combination of two or more kinds. Due to the effect of a functional group modified onto the pigment, the pigment component of the self-dispersion type pigment can easily stay on a surface even when it is printed on a water absorbent substrate, and thus a sharp image can be obtained.

Meanwhile, as for the dispersing agent, those generally used for an ink can be used. Specifically, a surfactant including cationic, anionic, non-ionic and amphoteric surfactant described in JP 2012-51357 A can be used. In particular, a polymer surfactant (polymer dispersing agent) can be preferably used. A pigment dispersed by a polymer dispersing agent can form an ink coating while the pigment surface is covered with a polymer dispersing agent, the wax, and the resin, and thus an image with high glossiness can be obtained. Examples of a commercially available product include "SMA1440" (styrene-maleic acid-maleic acid ester polymer dispersing agent, weight average molecular weight of 7,000, acid value of 185 mg KOH/g) manufactured by Sartomer Company, "Joncryl 682" (styrene-acryl acid polymer dispersing agent, weight average molecular weight of 1,700, acid value of 238 mg KOH/g) manufactured by BASF Japan Ltd., and "RY72" (styrene-acrylic acid-acrylic acid ester polymer dispersing agent, weight average molecular weight of 14,800, acid value of 170 mg KOH/g) manufactured by Gifu Shellac Manufacturing Co., Ltd. The mass ratio between the dispersing agent and pigment is preferably 10:1 to 10:3. The content of the dispersing agent in an ink composition is, relative to 100 parts by mass of the whole amount of the ink composition, preferably 1 part by mass or less. When the content of the dispersing agent is within the above range, a printed material can have excellent water resistance or solvent resistance.

[Solvent]

The inkjet recording ink composition of the present invention contains a aqueous solvent. The aqueous solvent can be suitably selected from solvents which do not react with each component of the ink composition but can dissolve or disperse each component. In the present invention, the aqueous solvent indicates a solvent which is dissolved at 3 parts by mass or more in 100 parts by mass of water at 25° C. under 1 atmospheric pressure, and it is a concept including water.

In the present invention, it is preferable to contain, from the viewpoint of having dispersion stability of a resin, at least one solvent selected from an aqueous solvent and water at 50 parts by mass or more in 100 parts by mass of the whole solvent. It is more preferably contained at 70 parts by mass or more. It is even more preferably contained at 80 parts by mass or more. It is still even more preferably contained at 95 parts by mass or more.

Specific examples of the aqueous solvent include alkyl alcohols having 1 or more and 5 or less carbon atoms such as methyl alcohol, ethyl alcohol, n-propyl alcohol, isopropyl alcohol, n-butyl alcohol, sec-butyl alcohol, tert-butyl alcohol, isobutyl alcohol, or n-pentanol; monovalent alcohols such as 3-methoxy-3-methyl-1-butanol, 3-methoxy-1-propanol, 1-methoxy-2-propanol, or 3-methoxy-n-butanol; amides such as 1-dimethyl formamide, dimethyl acetamide, 3-methoxypropaneamide, 3-butoxypropaneamide, N,N-dimethyl-3-methoxypropaneamide, N,N-dibutyl-3-methoxypropaneamide, N,N-dibutyl-3-butoxypropaneamide, or N,N-dimethyl-3-butoxypropaneamide; ketones or ketoalcohols such as acetone or diacetonealcohol; ethers such as tetrahydrofuran or dioxane; oxyethylene or oxypropylene copolymers such as polyethylene glycol or polypropylene glycol; diols such as ethylene glycol, propylene glycol, diethylene glycol, dipropylene glycol, 1,3-propanediol, isobutylene glycol, triethylene glycol, tripropylene glycol, tetraethylene glycol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, or 3-methyl-1,5-pentanediol; triols such as glycerin, trimethylolethane, trimethylolpropane, or 1,2,6-hexanetriol: tetravalent alcohols such as mesoerythritol or pentaerythritol; monoalkyl ethers such as ethylene glycol monomethyl (or ethyl, propyl, n-butyl, isobutyl) ether, diethylene glycol monomethyl (or ethyl, propyl, n-butyl, isobutyl) ether, triethylene glycol monomethyl (or ethyl, propyl, n-butyl, isobutyl) ether, propylene glycol monomethyl (or ethyl, propyl, n-butyl) ether, or dipropylene glycol monomethyl (or ethyl, propyl, n-butyl) ether; dialkyl ethers of polyhydric alcohol such as diethylene glycol dimethyl ether, diethylene glycol diethyl ether, diethylene glycol ethylmethyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, or dipropylene glycol diethyl ether; alkanol amines such as monoethanolamine, diethanolamine, triethanolamine, N-methylethanolamine, N-ethylethanolamine, N-butylethanolamine, N-methyldiethanolamine, N-ethyldiethanolamine, or N-butyldiethanolamine; nitrogen-containing heterocyclic compounds such as N-methyl-2-pyrrolidone, 2-pyrrolidone, or 1,3-dimethyl-2-imidazolidinone; and cyclic compounds such as γ-butyrolactone or sulforane.

The aqueous solvent used in the present invention is preferably a solvent which is dissolved at 5 parts by mass or more in 100 parts by mass of water at 25° C. and 1 atmospheric pressure. When monoalkyl ethers are contained, for example, specific examples of the preferred include diethylene glycol monomethyl ether, diethylene glycol monoethyl ether, diethylene glycol mono-n-butyl ether, dipropylene glycol monoethyl ether, and dipropylene glycol monomethyl ether.

Furthermore, as an aqueous solvent of the present invention, an aqueous solvent in which the ratio (V50/V20) of the viscosity of 50% by mass aqueous solution of the aqueous solvent (V50) and the viscosity of 20% by mass aqueous solution of the aqueous solvent (V20) is in the range of 2.0 or more and 3.6 or less, in particular, an aqueous solvent of which the ratio is in the range of 2.0 or more and 3.2 or less is preferably contained, and the aqueous solvent is preferably contained at 50 parts by mass or more in 100 parts by mass of the whole aqueous solvent. That is because, as the aqueous solvent having viscosity ratio within the aforementioned range is contained at 50 parts by mass or more relative to 100 parts by mass of the whole aqueous solvent, rapid increase of ink viscosity after volatilization of water in the ink adhered to an inkjet nozzle can be suppressed, and due to good fluidity, an ink with favorable continuous ejection property or ejection property after allowing to stand can be provided. The aqueous solvent having the viscosity ratio within the aforementioned range is preferably at 70 parts by mass or more, and even more preferably 80 parts by mass or more relative to 100 parts by mass of the whole aqueous solvent.

Incidentally, the method for measuring the viscosity is not particularly limited if it allows viscosity measurement with good precision. Examples of the method include a method using a viscosity measurement device like a rheometer, a B type viscometer, and a capillary type viscometer, for example. The capillary type viscosity measurement can be performed based on the method described in DIN 53015 or ISO/DIS 12058. More specifically, the measurement can be performed at measurement temperature of 25° C. by using a capillary type viscometer "AMVn" manufactured by Anton Paar.

Preferred examples of the aqueous organic solvent which has V50/V20 satisfying the range of 2.0 or more and 3.6 or less include monovalent alcohols, diols, triols, monoalkyl ethers, and dialkyl ethers. It is more preferably monovalent alcohols, diols, or triols. Furthermore, ethylene glycol, diethylene glycol, triethylene glycol, propylene glycol, 1,2-butanediol, 1,2-hexanediol, 1,2-pentanediol, 1,3-propanediol, 1,3-butanediol, 1,4-butanediol, 3-methoxy-3-methyl-1-butanol, 3-methoxy-1-butanol, and glycerin are even more preferred.

Water to be contained in the above solvent preferably does not contain various ions, and de-ionized water is preferably used.

The content of water in the solvent can be suitably adjusted as long as each component can be dispersed or dissolved therein. In particular, it is preferably in the range of 10 parts by mass or more and 95 parts by mass or less, more preferably in the range of 20 parts by mass or more and 95 parts by mass or less, and even more preferably in the range of 30 parts by mass or more and 90 parts by mass or less relative to 100 parts by mass of the whole solvent.

That is because, as the content of water and aqueous solvent is within the aforementioned range, less nozzle clogging may be obtained due to high moistening property. Furthermore, ejection from an inkjet head can be easily performed.

The solvent content can be suitably adjusted in consideration of the dispersion property or ejection property of the ink composition. In particular, the solvent is preferably contained such that the ink solid content concentration is 0.1 part by mass or more and 30 parts by mass or less, more preferably 1 part by mass or more and 20 parts by mass or less, and even more preferably 1 part by mass or more and 15 parts by mass or less relative to 100 parts by mass of the whole ink composition. That is because, as the content is within the aforementioned range, an excellent ejection property can be obtained.

Incidentally, in the present invention, the solid content indicates all components other than a solvent in the ink.

[Other Components]

The inkjet recording ink composition of the present invention may contain other components within a range in which the effect of the present invention is not impaired. Examples of other components include a surfactant, an infiltrating agent, a moistening agent, a preservative, an anti-oxidant, a conductivity modifier, a pH adjuster, a viscosity modifier, an anti-foaming agent, and a deoxygenating agent.

In the present invention, from the viewpoint of enhancing the ejection stability of an inkjet recording ink composition and adjusting the surface tension of the ink composition, it preferably contains a surfactant.

The surfactant can be suitably selected from conventionally known ones. In particular, from the viewpoint of having an excellent property of adjusting surface tension, an anionic surfactant, a non-ionic surfactant, a silicone (silicon)-based surfactant, a fluoro surfactant, and an acetylene glycol-based surfactant are preferably used. Specific examples thereof include EMAL, LATEMUL, Pelex, NeoPelex, Demol (all are anionic surfactant; manufactured by Kao Corporation), Sannol, Lipolan, Lipon, and Lipal (all are anionic surfactant; manufactured by Lion Corporation), New Call 290-A, 290-KS, New Call 291-M, New Call 291-PG, New Call 291-GL, New Call 292-PG, New Call 293, New Call 297 (all are anionic surfactant; manufactured by Nippon Nyukazai Co., Ltd.), Noigen, Epan, and Solgen (all are non-ionic surfactant; manufactured by DKS Co. Ltd.) Emalgen, Amito, and Emasol (all are non-ionic surfactant; manufactured by Kao Corporation), Naroacty, Emulmin, and Sannonic (all are non-ionic surfactant; manufactured by Sanyo Chemical Industries, Ltd.), Surfynol 104, 82, 465, 485, TG, 2502, Dynol 604, Dynol 607 (all are acetylene glycol based surfactant; manufactured by Air Products and Chemicals, Inc.), Olfine E1004, E1010, PD-004, PD-501, PD-502, SPC, EXP4300, Surfynol MD-20 (all are acetylene glycol based surfactant; manufactured by; Nissin Chemical Co., Ltd.), Acetylenol EH, E40, E60, E81, E100, E200 (all are manufactured by Kawaken Fine Chemicals Co., Ltd.), Megaface (fluorine-based surfactant; manufactured by DIC Corporation), SURFLON (fluorine-based surfactant; manufactured by AGC SEIMI CHEMICAL CO., LTD., BYK-330, BYK-333, BYK-348, BYK-381, BYK-3455, BYK-3410, BYK-3411, BYK-DYNWET800, BYK-3440 (all are non-ionic surfactant; manufactured by BYK Chemie), SILFACE SAG503A, SILFACE SJM-002, SILFACE SJM-003 (all are silicone (silicon)-based surfactant; manufactured by Nissin Chemical Co., Ltd.), FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, 8616 ADDITIVE (all are silicone (silicon)-based surfactant; manufactured by Dow Corning Toray Co., Ltd.), and KF-6012, KF-6015, KF-6004, KF-6013, KF-6011, KF-6043, KP-104, 110, 112, 323, 341 (all are silicone (silicon)-based surfactant; manufactured by Shin-Etsu Chemical Co., Ltd.). The content of the surfactant is suitably adjusted based on the solvent or other component. The content of the surfactant is preferably 0.01 part by mass or more and 10.0 parts by mass or less and more preferably in the range of 0.1 part by mass or more and 5.0 parts by mass or less relative to 100 parts by mass of the whole inkjet recording ink composition.

In the present invention, from the viewpoint of having excellent storage stability and ejection stability of the ink, excellent dispersion stability of the resin, excellent water resistance and solvent resistance of a printed material, and having improved image sharpness, at least one selected from a compound represented by the following General Formula (I) and a polysiloxane compound is preferably contained as a surfactant. From the viewpoint of having an excellent balance between an infiltration property to a coated paper and wettability, a compound represented by the following General Formula (I) is preferably used, in particular. It is more preferable to contain the compound represented by the following General Formula (I) and a polysiloxane compound.

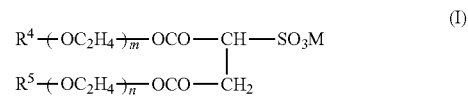

(in General Formula (I), $R^4$ and $R^5$ each independently represents a hydrogen atom or a linear or branched alkyl group having 1 or more and 20 or less carbon atoms, each of m and n is an integer of 0 or more and 20 or less, and M is a monovalent cation).

$R^4$ and $R^5$ each independently represents a hydrogen atom or a linear or branched alkyl group having 1 or more and 20 or less carbon atoms, and from the viewpoint of enhancing the dispersion stability of the resin emulsion, and enhancing the stability of the ink, a linear or branched alkyl group having 4 or more and 20 or less carbon atoms is preferable, and a linear or branched alkyl group having 4 or more and 12 or less carbon atoms is more preferable. That is because a good ink infiltration property is obtained, it has high affinity for the resin, and thus the effect of enhancing the resin-dispersing property is high.

The values of m and n represent repetition number of ethylene oxide, and they can be suitably selected depending on the type of the resin or solvent, for example.

M can be suitably selected from known monovalent cations, and examples thereof include lithium ($Li^+$), sodium ($Na^+$), potassium ($K^+$), ammonia ($NH_4^+$), and triethanolamine (($HOCH_2CH_2C)_3NH^+$). In particular, from the viewpoint of the storage stability, that is, suppressing a change in viscosity or surface tension during long-term storage of an ink, sodium ($Na^+$) and potassium ($K^+$) are preferable.

Specific examples of the compound represented by General Formula (I) include AEROSOL TR-70 (ditridecylsulfosuccinate sodium), TR-70HG (ditridecylsulfosuccinate sodium), OT-75 (dioctyl sulfosuccinate sodium), OT-N (dioctyl sulfosuccinate sodium), MA-80 (dihexylsulfosuccinate sodium), IB-45 (diisobutyl sulfosuccinate sodium), EF-800 (sulfosuccinate sodiumethylene oxide modified half ester), and A-102 (sulfosuccinate sodium ethylene oxide modified half ester) manufactured by Nihon Cytec Industries, Pelex OT-P (dialkyl sulfosuccinate sodium), Pelex CS (dialkyl sulfosuccinate sodium), Pelex TR (dialkyl sulfosuccinate sodium), and Pelex TA (dialkyl sulfosuccinate sodium) manufactured by Kao Corporation, and New Call 290-A (dialkyl sulfosuccinate sodium), New Call 290-KS (dialkyl sulfosuccinate sodium), New Call 291-M (di-2-ethylhexylsulfosuccinate sodium), New Call 291-PG (di-2-ethylhexylsulfosuccinate sodium), New Call 291-GL (di-2-ethylhexylsulfosuccinate sodium), New Call 292-PG (dipolyoxyethylene-2-ethylhexylsulfosuccinate sodium), New Call 293 (monoalkyl sulfosuccinate disodium), and New Call 297 (monoalkyl sulfosuccinate disodium) manufactured by Nippon Nyukazai Co., Ltd. Among them, dialkylsulfosuccinate and dipolyoxyethylenealkylsulfosuccinate can be preferably used.

In particular, di-2-ethylhexylsulfosuccinate, dihexylsulfosuccinate, ditridecylsulfosuccinate, dibutylsulfosuccinate, and dipolyoxyethylene-2-ethylhexylsulfosuccinate can be preferably used. That is because, by using the compound represented by General Formula (I), the dispersion stability of the resin can be further improved.

When the compound represented by General Formula (I) is used as a surfactant, the content is not particularly limited. However, from the viewpoint of the infiltration property of an ink and dispersion stability of a resin, it is preferably 0.005 part by mass or more, more preferably 0.01 part by mass or more, and even more preferably 0.03 part by mass or more relative to 100 parts by mass of the whole ink composition. Furthermore, the upper limit of the content of the compound represented by General Formula (I) is, although not particularly limited, preferably 5.0 parts by mass or less, more preferably 3.0 parts by mass or less, and even more preferably 1.0 part by mass or less relative to 100 parts by mass of the whole ink composition. That is because, as the content is within the aforementioned range, a good ink infiltration property and good dispersion stability of the resin can be obtained.

The polysiloxane compound used as a surfactant is not particularly limited if it has a polysiloxane bond (—Si—O—Si—) as a main skeleton, in particular a siloxane constitutional unit represented by the following General Formula (II).

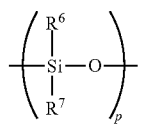

(II)

(in General Formula (II), $R^6$ and $R^7$ each independently represents a hydrogen atom, an alkyl group having 1 or more and 4 or less carbon atoms, or a phenyl group, and a plurality of $R^6$s may be the same or different to each other, a plurality of $R^7$s may be the same or different to each other, and furthermore p is an integer of 2 or higher).

$R^6$ and $R^7$ are preferably an alkyl group having 1 or more and 4 or less carbon atoms from the viewpoint of having an excellent effect of lowering the surface tension and improving the wettability of the ink composition. In particular, a compound having a methyl group, that is, a polydimethylsiloxane compound, is more preferable.

Furthermore, p is not particularly limited if it is an integer of 2 or higher. However, it is preferably in the range of 2 or more and 10,000 or less, and more preferably in the range of 2 or more and 2,000 or less. That is because, by having a structure with such repetition number, the excellent effect of lowering the surface tension can be obtained.

The polysiloxane compound is not particularly limited if it has the siloxane constitutional unit described above. However, it is preferably a compound having a polyether group, that is, a polysiloxane compound modified with a polyether group. That is because, by having the polyether group, the polysiloxane compound can be easily prepared to be water soluble.

Examples of the polyether group include a group containing alkylene oxide. In particular, a group containing ethylene oxide and a group containing propylene oxide are preferable. A group containing ethylene oxide is particularly preferable. That is because, as it is an alkylene oxide group, it can be easily prepared to be water soluble.

The polysiloxane compound modified with a polyether group is not particularly limited if it has the aforementioned polyether group. For example, it can be a polysiloxane compound in which the silicon atom at single end or both ends of polysiloxane structure is substituted with a polyether group, or a polysiloxane compound having a polyether-containing constitutional unit in which side chain of the polysiloxane structure, that is, any one of $R^6$ and $R^7$ in the siloxane constitutional unit, is substituted with a polyether group.

More specifically, examples include a polydimethylsiloxane modified with a polyether group which has a dimethylsiloxane constitutional unit in which $R^6$ and $R^7$ are each a methyl group and a polyether group-containing constitutional unit in which any one of $R^6$ and $R^7$ is a methyl group and the other is a polyether group, and an terminal-modified type polydimethylsiloxane modified with a polyether group which has a dimethylsiloxane constitutional unit in which $R^6$ and $R^7$ are each a methyl group and the polyether group is contained at the terminal.

Weight average molecular weight of the polysiloxane compound is not particularly limited if it allows obtainment of desired wettability. However, it is preferably in the range of 300 or more and 60,000 or less. In particular, it is more preferably in the range of 500 or more and 30,000 or less, and particularly preferably in the range of 1,000 or more and 15,000 or less. That is because, as the molecular weight is within the aforementioned range, an excellent wettability can be obtained.

The polysiloxane compound is preferably water soluble. That is because, as it is water soluble, a deteriorated ejection property due to ink repellency by an inkjet head, which is caused by precipitation of the polysiloxane compound on an ink surface or precipitation of the compound on a surface of a member of an inkjet head, can be suppressed.

"Water soluble" as described herein means being dissolved at 0.1 part by mass or more in 100 parts by mass of water at 25° C. and 1 atmospheric pressure.

Incidentally, as for a method for controlling the degree of water solubility of a polysiloxane compound, the control can be made based on the type or number of the polyether group, or the molecular weight of the polysiloxane compound, for example.

In the present invention, a polyether-modified polysiloxane compound having a polyether group can be preferably used as a polysiloxane compound. In particular, a polyether-modified polysiloxane compound having water solubility can be more preferably used.

Examples of a commercially available product of the polyether-modified polysiloxane compound having water solubility include FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, 8616 ADDITIVE (all are manufactured by Dow Corning Toray Co., Ltd.), KF-6012, KF-6015, KF-6004, KF-6013, KF-6011, KF-6043, KP-104, 110, 112, 323, 341, (all are manufactured by Shin-Etsu Chemical Co., Ltd.), BYK-300/302, BYK-301, BYK-306, BYK-307, BYK-320, BYK-325, BYK-330, BYK-331, BYK-333, BYK-337, BYK-341, BYK-342, BYK-344, BYK-345/346, BYK-347, BYK-348, BYK-349, BYK-375, BYK-377, BYK-378, BYK-UV3500, BYK-UV3510, BYK-310, BYK-315, BYK-370, BYK-UV3570, BYK-322, BYK-323, BYK-3455, BYK-Silclean3700, (all are manufactured by BYK Chemie), and SILFACE SAG503A, SILFACE SJM-002, SILFACE SJM-003 (all are manufactured by Nissin Chemical Co., Ltd.).

The content of the polysiloxane compound is not particularly limited. However, from the viewpoint of having a good wettability, it is preferably 0.001 part by mass or more, more preferably 0.01 part by mass or more, and even more preferably 0.05 part by mass or more relative to 100 parts by mass of the whole ink composition. Furthermore, the upper limit of the content of the polysiloxane compound is, although not particularly limited, preferably 5.0 parts by mass or less, more preferably 3.0 parts by mass or less, and even more preferably 1.0 part by mass or less relative to 100 parts by mass of the whole ink composition. That is because, as the content is within the aforementioned range, a good wettability of an ink is obtained so that a dot diameter can be increased when the ink is landed on a substrate.

The ratio (mass ratio) between the compound represented by General Formula (I) and the polysiloxane compound represented by General Formula (II), which are contained in an ink, is preferably 1:100 to 100:1, more preferably 1:50 to 50:1, and even more preferably 1:30 to 30:1. That is because, as the polysiloxane compound is contained at the above ratio with the compound represented by General Formula (I), a good balance between the infiltration property into a coated paper and wettability can be obtained and an image with excellent sharpness can be obtained.

Furthermore, the total amount of the compound represented by General Formula (I) and the polysiloxane compound is preferably 0.005 part by mass or more, more preferably 0.01 part by mass or more, and even more preferably 0.05 part by mass or more relative to 100 parts by mass of the whole ink composition. Furthermore, the upper limit of the total amount of the compound represented by General Formula (I) and the polysiloxane compound is, although not particularly limited, preferably 15.0 parts by mass or less, more preferably 10.0 parts by mass or less, and even more preferably 5.0 parts by mass or less relative to 100 parts by mass of the whole ink composition. That is because both excellent infiltration property and excellent wettability can be obtained.

The surface tension of the ink of the present invention is not particularly limited if it allows ejection of an ink from an inkjet head, and it varies depending on the type of a recording medium or the type of an inkjet head. For example, if a recording medium is uncoated paper, the paper has a high water absorbing property so that the printing can be made within the range of 20 mN/m or more and 50 mN/m or less.

On the other hand, if a recording medium has a low water absorbing property like coated paper, it is preferably in the range of 20 mN/m or more and 35 mN/m or less, more preferably in the range of 20 mN/m or more and 32 mN/m or less, even more preferably in the range of 20 mN/m or more and 30 mN/m or less, and still even more preferably in the range of 20 mN/m or more and 28 mN/m or less.

That is because, by having a value equal to or less than the upper limit described above, the ink is not likely absorbed and is repelled on a surface, and thus even when a coated paper not easily allowing large size dots is used, a surface of the coated paper can be wetted and the ink is spread thereon to enlarge the dot size, thus enabling forming of an image with high sharpness. Furthermore, by having a value equal to or more than the lower limit described above, the ejection stability of an ink from an inkjet head can be improved.

Incidentally, as described herein, the surface tension described in the present invention is a value measured by Wilhelmy method (manufactured by Kyowa Interface Science Co., LTD., Model: CBVP-Z) at measurement temperature of 25° C.

The pH of the inkjet recording ink composition of the present invention is preferably 7 or more and 12 or less, and more preferably 7 or more and 10 or less from the viewpoint of suppressing aggregation or precipitation of the resin emulsion, having excellent dispersion stability and ejection stability of the ink, and suppressing corrosion of a metal such as the inkjet nozzle.

Incidentally, as for the pH value described in the present invention, a value measured by "Method for measuring pH" of JIS Z 8802-2011 is used.

[Method for Producing Inkjet Recording Ink Composition]

The method for producing the inkjet recording ink composition is not particularly limited and can be suitably selected from known methods of a related art. Examples of the method include a method in which a dispersion having a self-dispersion type pigment provided with dispersion property according to modification of a pigment with a functional group, a resin emulsion, and a wax emulsion containing the polyolefin-based wax are prepared respectively in a solvent and admixed with one another, and a method in which a pigment and a dispersing agent are added and dispersed in a solvent and then a resin emulsion, a wax emulsion, and if necessary, other components such as a surfactant are added.

[Inkjet Recording Method and Method for Producing Printed Material]

The inkjet recording method of the present invention includes a step of printing by an inkjet method using the inkjet recording ink composition according to the present invention.

Furthermore, the method for producing a printed material of the present invention includes a step of printing on a recording medium by an inkjet method using the inkjet recording ink composition according to the present invention.

As the inkjet recording method and method for producing a printed material of the present invention use the inkjet recording ink composition of the present invention, a printed material that has excellent water resistance or solvent resistance and glossiness can be produced. Furthermore, since the inkjet ink composition has excellent ejection stability, a printed material with high quality can be obtained.

The inkjet method in the present invention can be suitably selected from known methods of a related art. The specific examples of the inkjet method may be any one of the followings: a charge control system in which an ink is ejected by using electrostatic attraction, a drop-on-demand system in which oscillation pressure of a piezoelectric element is utilized (pressure pulse system), an acoustic inkjet system in which an ink is ejected by using radiation pressure after converting an electric signal to acoustic beam and irradiating an ink with the beam, and a thermal inkjet (bubble jet (registered trademark)) system in which air bubbles are formed by heating an ink and the resulting pressure is utilized.

In the present invention, the ink droplet amount of an ink ejected by an inkjet method is not particularly limited and can be suitably adjusted depending on use. From the viewpoint of obtaining a printed material with high resolution, the ink droplet amount is preferably 0.5 µl or more and 30 µl or less and more preferably 1.0 µl or more and 25 µl or less. Since a wax emulsion having an average particle diameter of 140 nm or less is used, the inkjet recording ink composition of the present invention exhibits excellent ejection stability even when the ink droplet amount is reduced.

The recording medium used for the inkjet recording method and the method for producing a printed material of the present invention is not particularly limited as long as printing can be performed by using the inkjet ink composition of the present invention, and any one of an absorbing material or a non-absorbing material can be used. Examples of the absorbing material include uncoated paper such as ground wood paper, medium-quality paper or high-quality paper, coated paper such as coat paper, art paper or cast paper, cotton, synthetic fabrics, silk, hemp, cloth, unwoven cloth and leather. Examples of the non-absorbing material include, but are not limited to, a polyester-based resin, a polypropylene-based synthetic paper, a vinyl chloride resin, a polyimide resin, metals, metal foil coat paper, glass, synthetic rubbers, and natural rubbers.

In the present invention, coated paper and the non-absorbing material is preferably used, in particular. That is because, as the ink composition according to the present invention is used, the effect of the present invention can be more effectively exhibited.

Incidentally, the present invention is not limited to the aforementioned embodiments. Those embodiments are mere exemplifications and whatever having substantially the same constitution as the technical idea described in the claim of the present invention and exhibits the same working effect is embraced within the technical scope of the present invention.

EXAMPLES

Hereinbelow, the present invention will be described specifically by way of examples. However, the present invention is not limited to these descriptions.

Preparation Example 1: Preparation of Pigment Dispersion P-1

The same procedures as those described in Kieczykowski at al., J. Org. Chem., 1995, Vol 60, P. 8310 to 8312 and U.S. Pat. No. 4,922,007 were used to produce a [2-(4-aminophenyl)-1-hydroxyethane-1,1-diyl]bisphosphonic acid sodium salt. First, a 500 mL three-neck flask was equipped with a condenser provided with a gas outlet at the top thereof, a thermometer, a dry nitrogen introduction port, and a 100 mL equalizing dropping funnel. First, 32 part by mass of phosphorous acid (380 mmol) and 160 mL of methanesulfonic acid (solvent) were added to this flask. To the stirred mixture, 57.4 part by mass of aminophenylacetic acid (380 mmol) was added little by little. The stirred mixture was heated at 65° C. for 1 to 2 hours to dissolve the solid completely. The whole system was flushed with dry nitrogen and the temperature of the system was dropped to 40° C. after the solid was completely dissolved. To the heated solution, 70 mL of $PCl_3$ (800 mmol) was gradually added through the dropping funnel. HCl gas generated from the reaction was discharged through the gas outlet. After the addition was completed, the reaction mixture was stirred for 2 hours and concurrently heated at 40° C. After that, the temperature of the system was heated to 65 to 70° C. and the mixture was stirred overnight. The produced clear and clean brown solution was cooled to ambient temperature and rapidly cooled by addition into the solution to 600 part by mass of an ice/water mixture.

This aqueous mixture was poured into a 1 L beaker and heated at 90 to 95° C. for 4 hours (the top of the beaker was covered with a glass plate). Then, this mixture was cooled to ambient temperature and the pH of this mixture was adjusted to 4 to 5 with a 50% NaOH solution. This mixture was cooled to 5° C. in an ice bath for 2 hours, and then, the resulted solid was collected by suction filtration. The collected solid was washed with 1 L of cooled deionized water and dried at 60° C. overnight to obtain a white or off-white solid product (production amount: 48 part by mass, yield: 39%). $^1$H-NMR data ($D_2O$/NaOH) of the obtained solid product was as follows: 7.3 (2H, d), 6.76 (2H, d), and 3.2 (2H, t). $^{13}$C-NMR data ($D_2O$/NaOH) of the obtained solid product was as follows: 141, 130, 128, 112, and 73.

Using a Silverson Mixer (6,000 rpm), carbon black (Black Pearls (registered trade mark) 700 carbon black (manufactured by Cabot Corporation), 20 mmol of the solid product above, 20 mmol of nitric acid, and 200 mL of deionized water were blended at ambient temperature. After 30 minutes, sodium nitrite (20 mmol) dissolved in a small amount of water was slowly added to this mixture. The temperature reached 60° C. by mixing to allow the reaction to proceed for one hour. Accordingly, a self-dispersion type pigment in which the above solid product is modified onto carbon black (including pigments in which at least two phosphonic acid groups or salt thereof are bonded) was produced. The pH was adjusted to 8 to 9 with a NaOH solution. After 30 minutes, the dispersion having a self-dispersion type pigment generated therein was subjected to diafiltration by using 20 parts by volume of deionized water with a spectrum membrane to concentrate to have the solid content of 15% by mass. As a result, a black Pigment dispersion P-1 was obtained.

Preparation Example 2: Preparation of Pigment Dispersion P-2

A red pigment dispersion P-2 was obtained in the same manner as Preparation Example 1 except that C.I. Pigment Red 122 is used instead of carbon black of Preparation Example 1.

Preparation Example 3: Preparation of Pigment Dispersion P-3

In 80.1 parts by mass of ion exchange water, 3.0 parts by mass of a styrene-acrylic acid based polymer dispersing agent ("Joncryl 682" manufactured by BASF Japan Ltd., weight average molecular weight of 1,700, and acid value of 238 mg KOH/g) and 1.1 parts by mass of N,N-dimethyl-2-aminoethanol were dissolved. After adding 15 parts by mass of carbon black and 0.1 part by mass of an antifoaming agent ("Surfynol 104E" manufactured by Air Products and Chemicals, Inc.), they were dispersed by a paint shaker using zirconia beads to obtain a black pigment dispersion P-3. Incidentally, the styrene-acrylic acid based polymer dispersing agent is not an emulsion and it has a property which is different from that of the resin emulsion of the present invention.

Preparation Example 4: Preparation of Resin Emulsion EM-1

(1) After the atmosphere in a flask equipped with a mechanical stirrer, a thermometer, a nitrogen introduction tube, a reflux tube and a dropping funnel was sufficiently replaced with nitrogen gas, the flask was charged with 0.75 part by mass of a reactive surfactant (product name: LATEMUL PD-104, manufactured by KAO Corporation), 0.04 part by mass of potassium persulfate, 0.2 part by mass of methacrylic acid, and 150 parts by mass of pure water, and they were stirred at 25° C. to mix. A mixture of 20.8 parts by mass of butyl acrylate, 39 parts by mass of butyl methacrylate, and 90 parts by mass of methyl methacrylate was added dropwise to the above mixture to prepare a pre-emulsion 1.

(2) Further, separately from above (1), after the atmosphere in a flask equipped with a mechanical stirrer, a thermometer, a nitrogen introduction tube, a reflux tube and a dropping funnel was sufficiently replaced with nitrogen gas, the flask was charged with 3 parts by mass of a reactive surfactant (product name: LATEMUL PD-104, manufactured by KAO Corporation), 0.01 part by mass of potassium persulfate, and 200 parts by mass of pure water, and they were stirred at 70° C. to mix. After that, the pre-emulsion 1 prepared above (1) was added dropwise to the flask over 3 hours. After they were further aged at 70° C. under heating for 3 hours, 0.75 part by mass of N,N-dimethyl-2-aminoethanol was added thereto. Then, the resulting mixture was filtered by a #150 mesh filter (manufactured by Nippon Orimono Co., Ltd.) to obtain 500 parts by mass of a resin emulsion EM-1 (solid content: 30% by mass, Tg: 48° C., and acid value: 1 mg KOH/g).

Preparation Example 5: Preparation of Resin Emulsion EM-2

(1) With regard to (1) of Preparation Example 4, the charge amount was changed as follows; 0.75 part by mass of LATEMUL PD-104, 0.04 part by mass of potassium persulfate, 1.5 parts by mass of methacrylic acid, and 150 parts by mass of pure water, and they were stirred at 25° C. to mix similar to (1) of Preparation Example 4. Then, a mixture of 15 parts by mass of butyl acrylate, 21 parts by mass of butyl methacrylate, and 112.5 parts by mass of methyl methacrylate was added dropwise to the above mixture to prepare a pre-emulsion 2.

(2) Also, separately from above (1), after the atmosphere in a flask equipped with a mechanical stirrer, thermometer, a nitrogen introduction tube, a reflux tube and a dropping funnel was sufficiently replaced with nitrogen gas, the flask was charged with 3 parts by mass of a reactive surfactant (product name: LATEMUL PD-104, manufactured by KAO Corporation), 0.01 part by mass of potassium persulfate, and 200 parts by mass of pure water, and they were stirred at 70° C. to mix. After that, the pre-emulsion 2 produced above (1) was added dropwise to the flask over 3 hours. After they were further aged at 70° C. under heating for 3 hours, 0.75 part by mass of 2-amino-2-methyl-1-propanol was added thereto. Then, the resulting mixture was filtered by a #150 mesh filter (manufactured by Nippon Orimono Co., Ltd.) to obtain 500 parts by mass of a resin emulsion EM-2 (solid content: 30% by mass, Tg: 67° C., and acid value: 7 mg KOH/g).

Preparation Example 6: Preparation of Resin Emulsion EM-3

(1) With regard to (1) of Preparation Example 4, the charge amount was changed as follows: 0.75 part by mass of LATEMUL PD-104, 0.04 part by mass of potassium persulfate, 0.6 part by mass of methacrylic acid, and 150 parts by mass of pure water, and they were stirred at 25° C. to mix similar to (1) of Preparation Example 4. Then, a mixture of 38.4 parts by mass of butyl acrylate, 36 parts by mass of butyl methacrylate, and 75 parts by mass of methyl methacrylate was added dropwise to the above mixture to prepare a pre-emulsion 3.

(2) Further, separately from above (1), after the atmosphere in a flask equipped with a mechanical stirrer, a thermometer, a nitrogen introduction tube, a reflux tube and a dropping funnel was sufficiently replaced with nitrogen gas, the flask was charged with 3 parts by mass of a reactive surfactant (product name: LATEMUL PD-104, manufactured by KAO Corporation), 0.01 part by mass of potassium persulfate, and 200 parts by mass of pure water, and they were stirred at 70° C. to mix. After that, the pre-emulsion 3 produced above (1) was added dropwise to the flask over 3 hours. After they were further aged at 70° C. under heating for 3 hours, 0.75 part by mass of 2-amino-2-methyl-1-propanol was added thereto. Then, the resulting mixture was filtered by a #150 mesh filter (manufactured by Nippon Orimono Co., Ltd.) to obtain 500 parts by mass of a resin emulsion EM-3 (solid content: 30% by mass, Tg: 28° C., and acid value: 3 mg KOH/g).

(Resin Emulsion EM-4)

Furthermore, as a resin emulsion EM-4, JONCRYL 1535 (manufactured by BASF, Tg: 50° C., and acid value: 98 mg KOH/g) was used.

Preparation Example 7: Preparation of Wax Emulsion W-1

Polyethylene wax with melting point of 103° C. (15 parts by mass), paraffin wax with melting point of 88° C. (7.5 parts by mass), and oxidized polyethylene wax with melting point of 110° C. and acid value of 20 mg KOH/g (7.5 parts by mass) were admixed with one another and dissolved by heating at 85 to 95° C. Subsequently, 3.0 parts by mass of isopropanolamine was added thereto and 67 parts by mass of hot water at 85 to 95° C. was slowly added under heating to perform phase inversion emulsification. After the phase inversion emulsification was completed, the obtained crude emulsified product was stirred at high speed of 2,500 to 3,500 rpm using a homomixer (T.K. Homo mixer, manufactured by Tokushu Kika Kogyo Co., Ltd.) while being heated. It was subsequently subjected to a treatment at high pressure of 380 to 420 kg/cm$^2$ by using a homogenizer (APV GAULIN, INC. 15MR-STA). After that, it was cooled to 38° C. under stirring to obtain a wax emulsion W-1 which has average particle diameter of 90 nm and melting point of 101° C. and does not contain a surfactant.

Preparation Example 8: Preparation of Wax Emulsion W-2

A wax emulsion W-2 which has average particle diameter of 100 nm and melting point of 98° C. and does not contain a surfactant was obtained in the same manner as Preparation Example 7 except that 15 parts by mass of polyethylene wax with melting point of 124° C., 10.5 parts by mass of oxidized polyethylene wax with melting point of 100° C. and acid value of 20 mg KOH/g, and 4.5 parts by mass of paraffin wax with melting point of 88° C. were admixed with one another and dissolved by heating at 85 to 95° C. and 5.0 parts by mass of isopropanolamine was added thereto.

Preparation Example 9: Preparation of Wax Emulsion W-3

A wax emulsion W-3 which has average particle diameter of 110 nm and melting point of 102° C. and does not contain a surfactant was obtained in the same manner as Preparation Example 7 except that 21 parts by mass of polyethylene wax with melting point of 103° C. and 9 parts by mass of oxidized polyethylene wax with melting point of 110° C. and acid value of 20 mg KOH/g were admixed with each other and dissolved by heating at 85 to 95° C. and 5.0 parts by mass of monoethanolamine is added thereto.
(Wax Emulsion W-4)
Furthermore, as a wax emulsion W-4, PEM-17 manufactured by SAN NOPCO Ltd. (average particle diameter of 60 nm, melting point of 103° C., polyethylene-based wax emulsion containing 3 parts by mass of a surfactant relative to 100 parts by mass of polyethylene-based wax) was used.
(Comparative Wax Emulsions W-5 to W-11)
As comparative wax emulsions W-5 to W-11, the followings were used.
W-5: AQUACER498 (manufactured by BYK Chemie, paraffin wax emulsion which has particle diameter of 300 nm and melting point of 58° C.)
W-6: carnauba wax emulsion A118 (manufactured by Gifu Shellac Manufacturing Co., Ltd., carnauba wax emulsion which has particle diameter of 300 nm and melting point of 80° C.)
W-7: AQUACER513 (manufactured by BYK Chemie, polyethylene wax emulsion which has particle diameter of 150 nm and melting point of 130° C. and contains a surfactant at 8 parts by mass relative to 100 parts by mass of the polyethylene-based wax).
W-8: AQUACER515 (manufactured by BYK Chemie, paraffin wax emulsion which has particle diameter of 150 nm and melting point of 130° C. and contains a surfactant at 15 parts by mass relative to 100 parts by mass of the polyethylene-modified paraffin wax).
W-9: AQUACER539 (manufactured by BYK Chemie, paraffin wax emulsion which has particle diameter of 220 nm and melting point of 90° C. and contains a surfactant at 20 parts by mass relative to 100 parts by mass of paraffin).
W-10: Chemipearl W4005 (manufactured by Mitsui Chemicals, Incorporated, polyethylene wax emulsion which has particle diameter of 600 nm and melting point of 110° C. and does not contain a surfactant).
W-11: JONCRYL WAX 26J (polyethylene wax emulsion which has particle diameter of 90 nm and melting point of 130° C. and contains a surfactant at 6% by mass relative to 100 parts by mass of the polyethylene wax).

Examples 1 to 15: Production of Ink Compositions 1 to 15

According to the composition of the following Table 1, each component was admixed with each other. By further adding water (that is, ion exchange water) to have a total amount of 100 parts by mass, the ink compositions 1 to 15 were obtained.
The numerical values for each component in Table 1 are described in parts by mass and the numerical values for pigment dispersion, resin emulsion, and wax emulsion indicate the solid content expressed in parts by mass.

Comparative Examples 1 to 9: Preparation of Comparative Ink Compositions 1 to 9

According to the compositions shown in the following Table 1, the comparative ink compositions 1 to 9 were obtained in the same manner as Examples.

TABLE 1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Ink composition | Pigment dispersion | P-1 | 5.0 | 5.0 | 5.0 | 5.0 | 5.0 | 5.0 | 5.0 | 3.0 | | | | |
| | | P-2 | | | | | | | | | 5.0 | 5.0 | 5.0 | 5.0 |
| | | P-3 | | | | | | | | | | | | |
| | Resin emulsion | EM-1 | 5.0 | | | 5.0 | 5.0 | 5.0 | 5.0 | | 5.0 | 5.0 | 5.0 | |
| | | EM-2 | | 5.0 | | | | | | 5.0 | | | | 5.0 |
| | | EM-3 | | | 5.0 | | | | | | | | | |
| | | EM-4 | | | | | | | | | | | | |
| | Wax emulsion | W-1 | 3.0 | 3.0 | 3.0 | 3.0 | | | | | 3.0 | 1.0 | 3.0 | |
| | | W-2 | | | | | 3.0 | | | | | | | |
| | | W-3 | | | | | | 3.0 | | | | | | |
| | | W-4 | | | | | | | 3.0 | 1.0 | | 1.0 | | 3.0 |
| | | W-5 | | | | | | | | | | | | |
| | | W-6 | | | | | | | | | | | | |
| | | W-7 | | | | | | | | | | | | |
| | | W-8 | | | | | | | | | | | | |
| | | W-9 | | | | | | | | | | | | |
| | | W-10 | | | | | | | | | | | | |
| | | W-11 | | | | | | | | | | | | |
| | Solvent | S-1 | 30.0 | 30.0 | 30.0 | 30.0 | 30.0 | 30.0 | 30.0 | 30.0 | 30.0 | 30.0 | 30.0 | 30.0 |
| | | S-2 | | | | | | | | | | | | |
| | | S-3 | | | | | | | | | | | | |
| | | S-4 | | | | | | | | | | | | 5.0 |

TABLE 1-continued

| | | | | | | | | | | | | | | |
|---|---|---|---|---|---|---|---|---|---|---|---|---|---|---|
| | Additive | A-1 | 0.5 | 0.5 | 0.5 | 0.5 | 0.5 | 0.5 | 0.5 | 0.5 | 0.5 | 0.5 | 0.5 | 0.2 |
| | | A-2 | | | | 0.5 | 0.5 | 0.5 | 0.5 | 0.5 | 0.5 | 0.5 | 0.5 | 0.5 |
| | | A-3 | | | | | | | | | | | | 0.2 |
| | Ion exchange water | | 56.5 | 56.5 | 56.5 | 56.0 | 56.0 | 56.0 | 56.0 | 60.0 | 56.0 | 57.0 | 51.0 | 56.1 |
| | Total | | 100.0 | 100.0 | 100.0 | 100.0 | 100.0 | 100.0 | 100.0 | 100.0 | 100.0 | 100.0 | 100.0 | 100.0 |
| Evaluation | Storage stability | | A | A | A | A | A | A | A | A | A | A | A | A |
| | Ejection stability | | A | A | A | A | A | A | A | A | A | A | A | A |
| | Ejection recovery after allowing to stand | | A | A | A | A | A | A | B | A | A | A | A | A |
| | Water resistance | | A | A | A | A | A | A | A | A | A | A | A | A |
| | Scratch resistance | | A | A | A | A | A | A | A | A | A | A | A | A |
| | Glossiness | | A | A | A | A | A | B | A | A | A | A | A | A |

| | | | Example | | | Comparative Example | | | | | | | | |
|---|---|---|---|---|---|---|---|---|---|---|---|---|---|---|
| | | | 13 | 14 | 15 | 1 | 2 | 3 | 4 | 5 | 6 | 7 | 8 | 9 |
| Ink composition | Pigment dispersion | P-1 | | | 5.0 | 5.0 | 5.0 | 5.0 | 5.0 | 5.0 | 5.0 | 5.0 | 5.0 | 5.0 |
| | | P-2 | | | | | | | | | | | | |
| | | P-3 | 5.0 | 5.0 | | | | | | | | | | |
| | Resin emulsion | EM-1 | 5.0 | 5.0 | | 5.0 | 5.0 | 5.0 | 5.0 | 5.0 | 5.0 | 5.0 | 5.0 | |
| | | EM-2 | | | 5.0 | | | | | | | | | |
| | | EM-3 | | | | | | | | | | | | |
| | | EM-4 | | | | | | | | | | | | 5.0 |
| | Wax emulsion | W-1 | | 3.0 | | | | | | | | | | |
| | | W-2 | | | | | | | | | | | | |
| | | W-3 | | | | | | | | | | | | |
| | | W-4 | 3.0 | | 3.0 | | | | | | | | | |
| | | W-5 | | | | | 3.0 | | | | | | | 3.0 |
| | | W-6 | | | | | | 3.0 | | | | | | |
| | | W-7 | | | | | | | 3.0 | | | | | |
| | | W-8 | | | | | | | | 3.0 | | | | |
| | | W-9 | | | | | | | | | 3.0 | | | |
| | | W-10 | | | | | | | | | | 3.0 | | |
| | | W-11 | | | | | | | | | | | 3.0 | |
| | Solvent | S-1 | 30.0 | 20.0 | | 30.0 | 30.0 | 30.0 | 30.0 | 30.0 | 30.0 | 30.0 | 30.0 | 30.0 |
| | | S-2 | | 5.0 | 10.0 | | | | | | | | | |
| | | S-3 | | 10.0 | 10.0 | | | | | | | | | |
| | | S-4 | | | 5.0 | | | | | | | | | |
| | Additive | A-1 | 0.5 | 0.5 | | 0.5 | 0.5 | 0.5 | 0.5 | 0.5 | 0.5 | 0.5 | 0.5 | 0.5 |
| | | A-2 | | | 0.5 | | 0.5 | 0.5 | 0.5 | 0.5 | 0.5 | 0.5 | 0.5 | |
| | | A-3 | | | 0.2 | | | | | | | | | |
| | Ion exchange water | | 56.5 | 46.5 | 66.3 | 59.5 | 56.0 | 56.0 | 56.0 | 56.0 | 56.0 | 56.0 | 56.0 | 56.5 |
| | Total | | 100.0 | 100.0 | 100.0 | 100.0 | 100.0 | 100.0 | 100.0 | 100.0 | 100.0 | 100.0 | 100.0 | 100.0 |
| Evaluation | Storage stability | | A | A | A | A | C | C | C | C | C | C | C | C |
| | Ejection stability | | A | A | A | A | C | C | C | C | C | C | C | C |
| | Ejection recovery after allowing to stand | | B | A | A | A | C | C | C | C | C | C | C | C |
| | Water resistance | | A | A | A | A | C | C | C | C | C | B | C | C |
| | Scratch resistance | | A | A | A | C | C | C | B | B | B | B | C | C |
| | Glossiness | | A | A | A | B | C | C | C | C | C | C | C | C |

The abbreviations that are described in Table 1 are as described below.

S-1: propylene glycol
S-2: diethylene glycol
S-3: glycerin
S-4: 1,3-propanediol
A-1: di-2-ethylhexylsulfosuccinate sodium; compound represented by General Formula (I) (New Call 291PG (manufactured by Nippon Nyukazai Co., Ltd.))
A-2: polyalkoxy polydimethylpolysiloxane based: polysiloxane based compound represented by the general formula (II) (SILFACE SAG503A (manufactured by Nissin Chemical Co., Ltd.))
A-3: 2,5,8,11-tetramethyl-6-dodecine-5,8-diolethoxylate (Dynol 604 (manufactured by Air Products and Chemicals, Inc.))

[Evaluation]

<Evaluation of Dispersion Stability (Storage Stability)>

Each inkjet recording ink composition of Examples and Comparative Examples was sealed in a glass bottle, which was then stored for 2 weeks at 60° C. Then, the viscosity of the ink composition was measured before and after the storage and the evaluation was made. The results are shown in Table 1.

(Criteria for Evaluation of Dispersion Stability)

A: The rate of change in viscosity was 5% or less, when measured before and after the storage.

B: The rate of change in viscosity was more than 5% and 10% or less, when measured before and after the storage.

C: The rate of change in viscosity was more than 10%, when measured before and after the storage.

If the dispersion stability evaluation is A or B, it is evaluated as excellent storage stability and practically usable without problems.

<Evaluation of Ejection Stability>

Each inkjet recording ink composition of Examples and Comparative Examples was ejected continuously by using a printer provided with 720 dpi inkjet head for evaluation.

(Criteria for Evaluation of Ejection Stability)

A: A non-ejecting nozzle was not observed even when continuous printing of at least 100 sheets of A4 paper was performed.

B: A non-ejecting nozzle was observed when continuous printing of 50 or more but less than 100 sheets of A4 paper was performed.

C: A non-ejecting nozzle was observed when continuous printing of less than 50 sheets of A4 paper was performed.

If the ejection stability evaluation is A or B, it is evaluated as excellent ejection stability and practically usable without problems.

<Evaluation of Ejection Recovery after Allowing to Stand>

Each inkjet recording ink composition of Examples and Comparative Examples was charged in a 720 dpi inkjet head and allowed to stand for 30 minutes. After that, the ink composition was ejected from the inkjet head, and the ejection state after the allowing to stand was evaluated. The results are shown in Table 1.

(Standard for Evaluation of Intermittent Ejection Property)

A: Ejection was shown from every nozzle.

B: Nozzle with an occurrence of no ejection or distorted ejection was found, but it was all recovered by cleaning of 1 to 5 times.

C: Nozzle with an occurrence of no ejection or distorted ejection was found, and it took cleaning of at least 6 times until the recovery.

If the evaluation result of intermittent ejection property is A or B, it is evaluated as excellent intermittent ejection property and practically usable without any problem.

Incidentally, as for the aforementioned cleaning, an operation of wiping a nozzle surface after extruding an ink from a nozzle for 3 seconds at a pressure of 10 kPa·s was performed for each cleaning.

<Evaluation of Water Resistance>

Each inkjet recording ink composition of Examples and Comparative Examples was solid-printed on a coated paper (OK Top Coat Plus) by using a 720 dpi inkjet head. After drying it for 3 minutes at 100° C., a test specimen was prepared. Part of the test specimen was immersed for 5 minutes in ion exchange water, and by observing with a naked eye the printed material before and after the immersion, the water resistance was evaluated. The results are shown in Table 1.

(Standard for Evaluation of Water Resistance)

A: No change was shown in the printed material before and after immersion.

B: Slight change in glossiness or discoloration of the printed material was shown, but it was practically usable without any problem.

C: A change in glossiness of the printed material was observed, and the color was clearly weakened.

If the evaluation result of water resistance is A or B, it is evaluated as excellent water resistance and practically usable without any problem.

<Evaluation of Scratch Resistance>

Similar to the above water resistance evaluation, test specimens of each of Examples and Comparative Examples were prepared. The test specimens were rubbed with a cotton cloth, 100 times with a load of 200 g, and the scratch resistance was evaluated. The results are shown in Table 1.

(Criteria for Evaluation of Scratch Resistance)

A: No detachment was observed by rubbing.

B: A slight detachment was observed by rubbing.

C: A significant detachment was observed by rubbing.

If the scratch stability evaluation result is A or B, it is evaluated as excellent scratch resistance and practically usable without problems.

<Evaluation of Glossiness>

Similar to the above water resistance evaluation, test specimens of each of Examples and Comparative Examples were prepared. Glossiness of the test specimens was visually evaluated. The results are shown in Table 1.

(Criteria for Evaluation of Glossiness)

A: The same glossiness as the coated paper before printing was observed.

B: A slight difference in glossiness was observed compared to the coated paper before printing.

C: A clear difference in glossiness was observed compared to the coated paper before printing, and the printed area was not smooth.

If the evaluation of glossiness is A or B, it is evaluated as excellent glossiness.

[Summary of Results]

Comparative Example 1 not containing a wax emulsion exhibited poor scratch resistance. Comparative Examples 4 to 7 in which a wax emulsion with particle diameter of 150 nm or more is included exhibited good scratch resistance, but they were unfavorable in terms of storage stability and ejection stability of the ink, and ejection recovery after allowing to stand, and they exhibited deteriorated glossiness. The wax emulsion having low melting point such as Comparative Examples 2, 3 and 9 exhibited no effect of improving the scratch resistance.

Comparative Example 8 in which a wax emulsion with the particle diameter of 90 nm but the melting point of 130° C. is used was unfavorable in terms of storage stability and ejection stability of the ink, and ejection recovery after allowing to stand because of using the wax emulsion with a high melting point.

On the other hand, all the ink compositions of Examples 1 to 15 which contain a wax emulsion having an average particle diameter of 140 nm or less and containing a polyolefin-based wax with a melting point of 85° C. or more and 120° C. or less, a resin emulsion, a pigment, and an aqueous solvent exhibited excellent storage stability and ejection stability of the ink, and provided printed materials with excellent water resistance and scratch resistance.

The invention claimed is:

1. An inkjet recording ink composition comprising:
   a wax emulsion having an average particle diameter of 140 nm or less and containing a polyolefin-based wax having a melting point of 85° C. or more and 120° C. or less;
   a resin emulsion;
   a pigment; and
   an aqueous solvent,
   wherein the resin emulsion contains an acrylic resin having a glass transition temperature of 20° C. or more and an acid value of 25 ma KOH/g or less.

2. The inkjet recording ink composition according to claim 1, wherein a content of a surfactant contained in the wax emulsion is 5 parts by mass or less relative to 100 parts by mass of the polyolefin-based wax.

3. The inkjet recording ink composition according to claim 1, wherein the wax emulsion contains one or more kinds selected from a paraffin wax and a sasol wax.

4. An inkjet recording method comprising:
   printing by an inkjet method using the inkjet recording ink composition defined by claim 1.

5. A method for producing a printed material comprising:
printing on a recording medium by an inkjet method using the inkjet recording ink composition defined by claim 1.

6. The inkjet recording ink composition according to claim 1, wherein the hydroxyl group value of the acrylic resin is 10 mg KOH/g or less.

* * * * *